(12) United States Patent
Maliach et al.

(10) Patent No.: US 11,908,089 B2
(45) Date of Patent: Feb. 20, 2024

(54) AMBULATION SIMULATING APPARATUS

(71) Applicant: InerticX M.D.T LTD, Herzliya (IL)

(72) Inventors: Gal Maliach, Herzliya (IL); Roi Doitch, Einav (IL)

(73) Assignee: InerticX M.D.T LTD., Herzliya (IL)

( * ) Notice: Subject to any disclaimer, the term of this patent is extended or adjusted under 35 U.S.C. 154(b) by 20 days.

(21) Appl. No.: 17/618,527

(22) PCT Filed: Jun. 11, 2020

(86) PCT No.: PCT/IL2020/050648
§ 371 (c)(1),
(2) Date: Dec. 13, 2021

(87) PCT Pub. No.: WO2020/250228
PCT Pub. Date: Dec. 17, 2020

(65) Prior Publication Data
US 2022/0245902 A1 Aug. 4, 2022

(30) Foreign Application Priority Data

Jun. 13, 2019 (IL) .......................................... 267345

(51) Int. Cl.
*G06T 19/00* (2011.01)
*G06F 3/033* (2013.01)
(Continued)

(52) U.S. Cl.
CPC .......... *G06T 19/006* (2013.01); *A63F 13/211* (2014.09); *A63F 13/212* (2014.09);
(Continued)

(58) Field of Classification Search
CPC .... G06T 19/006; A63F 13/211; A63F 13/212; A63F 13/218; G06F 3/011; G06F 3/016
(Continued)

(56) References Cited

U.S. PATENT DOCUMENTS 5,562,572 A 10/1996 Carmein
5,557,981 A 11/1996 Jarvik
(Continued)

FOREIGN PATENT DOCUMENTS

CN 1326013 7/2006
CN 104407701 A 3/2015
(Continued)

OTHER PUBLICATIONS

D-Flow: Immersive Virtual Reality and Real-Time Feedback for Rehabilitation, Thomas Geijtenbeek et al. 2011.*
(Continued)

*Primary Examiner* — Javid A Amini
(74) *Attorney, Agent, or Firm* — PEARL COHEN ZEDEK LATZER BARATZ LLP

(57) ABSTRACT

An ambulation simulating apparatus, including: a user feet interface comprising foot rests; a dynamic inertia mechanism configured to provide an inertial load when a downwardly force is applied due to the foot and a kinematic connection configured to enable transmission of motion from the feet interface to the dynamic inertia and backwards as the dynamic inertia mechanism resists said downwardly applied force by the foot.

25 Claims, 13 Drawing Sheets

(51) Int. Cl.
  *G06F 3/01* (2006.01)
  *A63F 13/211* (2014.01)
  *A63F 13/212* (2014.01)
  *A63F 13/218* (2014.01)
  *G06F 3/0346* (2013.01)

(52) U.S. Cl.
  CPC ............ *A63F 13/218* (2014.09); *G06F 3/011* (2013.01); *G06F 3/016* (2013.01); *G06F 3/0334* (2013.01); *G06F 3/0346* (2013.01); G06F 2203/012 (2013.01)

(58) Field of Classification Search
  USPC ........................................................ 345/633
  See application file for complete search history.

(56) References Cited

U.S. PATENT DOCUMENTS

| | | | |
|---|---|---|---|
| 5,846,134 | A | 12/1998 | Latypov et al. |
| 5,902,214 | A | 5/1999 | Makikawa et al. |
| 6,102,832 | A * | 8/2000 | Tani ............... H04N 7/18 348/E13.058 |
| 6,135,928 | A | 10/2000 | Butterfield |
| 7,470,218 | B2 | 12/2008 | Williams |
| 9,307,932 | B2 * | 4/2016 | Mariani ............. A61B 5/112 |
| 9,770,203 | B1 | 9/2017 | Berme et al. |
| 10,856,796 | B1 * | 12/2020 | Berme ............... G06F 3/013 |
| 2003/0018449 | A1 | 1/2003 | Couvillion, Jr et al. |
| 2004/0242390 | A1 | 12/2004 | Willliams |
| 2006/0262120 | A1 * | 11/2006 | Rosenberg ........... G06F 3/011 345/473 |
| 2009/0256800 | A1 * | 10/2009 | Kaufman ............ G06F 3/011 715/700 |
| 2015/0297437 | A1 * | 10/2015 | Neuenhahn .......... G16H 20/30 601/148 |

FOREIGN PATENT DOCUMENTS

| | | |
|---|---|---|
| CN | 106621319 | 5/2017 |
| CN | 206489518 | 9/2017 |
| CN | 107708820 A | 2/2018 |
| CN | 107803026 | 3/2018 |
| CN | 109414612 A | 3/2019 |
| DE | 19507507 | 9/1996 |
| DE | 19713805 | 10/1997 |
| DE | 19805488 | 7/1999 |
| DE | 19895488 | 7/1999 |
| DE | 10060466 | 6/2002 |
| EP | 3159049 | 4/2017 |
| JP | H 1055132 A | 2/1998 |
| KR | 20020037107 | 5/2002 |
| KR | 20150118776 | 10/2015 |
| KR | 20180013696 | 2/2018 |
| KR | 101847380 | 4/2018 |
| KR | 20180105310 | 9/2018 |
| KR | 102103431 | 5/2020 |
| RU | 2640439 C1 | 1/2018 |
| WO | WO 2007064456 | 6/2007 |
| WO | WO 2010089618 | 8/2010 |
| WO | WO 2012136314 | 10/2012 |
| WO | WO 2015121279 A1 | 8/2015 |
| WO | WO 2016153442 | 9/2016 |
| WO | WO 2017184785 | 10/2017 |
| WO | WO 2018195344 | 10/2018 |
| WO | WO 201904589 A1 | 3/2019 |

OTHER PUBLICATIONS

Overview of CAREN Research, State of the Science Symposium: Virtual Reality and its Role in Wounded Warrior and Veteran Care. Erik J. Wolf, PhD, 2006.*
International Search Report of Application No. PCT/IL2020/050648 dated Sep. 16, 2020.

* cited by examiner

AMBULATION SIMULATING APPARATUS

CROSS-REFERENCE TO RELATED APPLICATIONS

This application is a National Phase Application of PCT International Application No. PCT/IL2020/050648, International Filing Date Jun. 11, 2020, claiming the benefit of Israeli Patent Application No. 267345 filed on Jun. 13, 2019, both of which are hereby incorporated by reference.

FIELD OF THE INVENTION

The present invention relates to the field of simulating apparatus, and more particularly to ambulation simulating apparatus.

BACKGROUND OF THE INVENTION

Virtual reality (VR) systems typically utilize walking devices, such as VR treadmills or foot-powered devices, to simulate a changing environment while a user is confined to a small space during performance of an ambulatory activity. Foot-powered virtual reality systems convert an actual step taken by a user to a change in position in virtual space that is viewable by a user in conjunction with sensors for detecting the value of a physical parameter associated with the foot movement, a processor for translating the foot movement to a change in a virtual space, and a wearable headset or another type of multi-projected environment. Many prior art systems provide the user with reduced-friction means for interfacing with the surface. A simulation provided by a virtual reality system has utility in relation to computer games, military and sport training, as well as health care.

The prior art systems require an expensive tracking system or step recognition apparatus in order to properly identify the foot movement and to convert it to a change in virtual space. Some prior art systems have an motorized/powered electronic compensation system for changes in leg acceleration or deceleration during different phases of the walking or jogging cycle, for example the initial swing phase when a foot is removed from the underlying surface and the midfoot strike phase. The compensation system identifies changes in leg acceleration or deceleration following performance of the ambulatory activity and therefore produce latency in the compensation, resulting in a reduction in simulation accuracy and a lack of stability.

An additional deficiency of prior art systems is that users thereof suffer from motion sickness due to instability resulting from interaction with the reduced-friction means, the instability being exacerbated by a VR-induced sensory mismatch that occurs when the vestibular sense does not receive stimulation at the moment of motion onset. Moreover, prior art VR systems require dedicated and expensive apparatuses, for example motorized apparatuses, in order to generate the VR experience.

SUMMARY OF THE INVENTION

Some embodiments of the present invention may provide an ambulation simulating apparatus, including: a user feet interface; a dynamic inertia mechanism configured to provide an inertial load; and a kinematic connection configured to enable transmission of motion between the dynamic inertia mechanism and the user feet interface.

In some embodiments, the ambulation simulating apparatus may include: a first and a second independently movable foot rests, wherein each of the first and second foot rests is coupled to the dynamic inertia mechanism by a corresponding kinematic connection to provide an inertial load; and a first and a second releasable coupling members couplable and decouplable with respect to the corresponding kinematic connection of the first and second foot rests, respectively; wherein the first and second coupling members are set to a coupled position with respect to the corresponding kinematic connection when a downwardly directed foot applied force is transmitted thereto to enable transmission of motion to the dynamic inertia mechanism in response to leg motion, and are set to a decoupled position with respect to the corresponding kinematic connection when the downwardly directed foot applied force is released.

In some embodiments, wherein the dynamic inertia mechanism is configured to at least one store kinematic energy and release the stored kinematic energy via the corresponding kinematic connection to a resting or decelerated foot rest of the first and second foot rests.

In some embodiments, the dynamic inertia mechanism is responsive to at least one of: transversal motion of each of the first and second foot rests; longitudinal foot rest motion of each of the first and second foot rests; and yaw foot rest motion of each of the first and second foot rests.

In some embodiments, the dynamic inertia mechanism is reconfigurable in order to define a mechanism-specific moment of inertia.

In some embodiments, a measure of engagement of each of the first and second coupling members with corresponding kinematic connection of the first and second foot rests is defined by a pressure applied by corresponding foot of a user on corresponding foot rest of the first and second foot rests.

In some embodiments, each of the first and second foot rests includes a pressure sensor configured to measure a pressure applied by the corresponding foot on the corresponding foot rest of the first and second foot rests, and wherein ambulation simulating apparatus includes a processor configured to: receive readings from the pressure sensor of each of the first and second foot rests; determine the measure of engagement of each of the first and second coupling members with the corresponding kinematic connection of the first and second foot rests based on the readings of the corresponding pressure sensor; and control the first and second coupling members to engage with the corresponding coupling member of the first and second coupling members according the corresponding determined measure of engagement.

In some embodiments, each of the first and second foot rests includes a vertically displaceable plate with which a corresponding foot is engageable throughout an ambulatory cycle.

In some embodiments, the ambulation simulating apparatus includes a feet tracking and foot rests moving mechanism and a processor, and wherein: the feet tracking and foot rests moving mechanism may include: a first and a second motor assemblies configured to move the first and the second foot rests, respectively, in at least one of a longitudinal direction, a transverse direction in a foot rests plane and about a yaw axis of the respective foot rest; feet tracking sensors configured to track movement of the feet of the user and to generate feet motion data indicative of the feet movement thereof; and the processor is configured to: detect, based on the feet motion data, that at least one foot of the user is not in contact with the respective at least one foot rest of the first and second foot rests; couple at least one coupling member of the first and second coupling members corresponding to the at least one foot rest with corresponding at least one motor assembly of the first and second motor assemblies; control the at least one motor assembly to move the respective at least one foot rest based on the feet motion data; detect, based on the feet motion data, that the at least one foot rest is in contact with the respective at least one foot rest; and decouple the at least one motor assembly from the respective at least one foot rest.

In some embodiments, the ambulation simulating apparatus comprises a backrest configured to constrain at least one of longitudinal, transversal and rotational movement of the user, the backrest is adjustable according to a height of the user and is configured to move in at least one of longitudinal, vertical, transversal, yaw, pitch and roll directions relative to a floor surface.

In some embodiments, the ambulation simulating apparatus may include at least one position sensor and at least one pressure sensor which are provided with each of the first and second foot rests, and a processor configured to receive and process a position indicating signal from each of the position sensors and a force indicating signal from each of the pressure sensors to determine characteristics of associated real-time leg motion.

In some embodiments, the ambulation simulating apparatus may include an immersed reality generating apparatus which is configured to generate images representative of an immersed reality environment that correspond to a real-time position of first and second legs of the user engaged with the first and second foot rests, respectively.

Some embodiments of the present invention may provide an ambulation simulating apparatus including means for constraining an upper body part of a user; first and second independently movable foot rests, a dynamic inertia responsive mechanism connected to each of said foot rests by a corresponding kinematic connection to provide an inertial load, and first and second releasable coupling members couplable and decouplable with respect to the corresponding kinematic connection of said first and second foot rests, respectively, wherein said first and second coupling members are set to a coupled position with respect to the corresponding kinematic connection when a downwardly directed foot applied force is transmitted thereto to enable transmission of motion to said mechanism in response to leg motion, and are set to a decoupled position with respect to the corresponding kinematic connection when the downwardly directed foot applied force is released.

In some embodiments, the inertia responsive mechanism is kinematically connected to a shaft that is kinematically connected to two other shafts, each of which is associated with a corresponding foot rest. Since the two other shafts are kinematically connected together, the two other shafts may generate a common reactive force for both legs resulting from interaction with the inertia responsive mechanism to provide the sensation that the legs are resting on a real ground surface.

In some embodiments, the inertia responsive mechanism is configured to release stored kinematic energy via the corresponding kinematic connection to a resting, or accelerated/decelerated foot rest.

In some embodiments, the inertia responsive mechanism is responsive to transversal foot rest motion. In some embodiments, the corresponding kinematic connection may include a longitudinal shaft, an elongated and transversally extending element in force transmitting relation with a corresponding foot rest and connectable with said longitudinal shaft, and a transversal shaft kinematically connected with said longitudinal shaft with which the inertia responsive mechanism is kinematically connected.

In some embodiments, the inertia responsive mechanism is responsive to longitudinal foot rest motion. In some embodiments, the corresponding kinematic connection may include a longitudinal shaft, a member slidable relative to said longitudinal shaft, an elongated element in force transmitting relation with a corresponding foot rest and with said slidable member, a rotatable member connected with said slidable member by a transmission and the releasable coupling member, and a transversal shaft with which the inertia responsive mechanism is kinematically connected and connected to the rotatable member.

In some embodiments, the ambulation simulating apparatus may further include at least one position sensor and at least one pressure sensor which are provided with each foot rest, and a processor configured to receive and process a position indicating signal from each of the position sensors and a force indicating signal from each of the pressure sensors to determine characteristics of associated real-time leg motion.

In some embodiments, the ambulation simulating apparatus may further include virtual reality generating apparatus which is configured to generate images representative of a virtual reality environment that correspond to a real-time position of first and second legs engaged with the first and second foot rests, respectively.

In some embodiments, each of the foot rests may include a vertically displaceable plate with which a corresponding foot is engageable throughout an ambulatory cycle.

In some embodiments, each of the foot rests is rotatable about a yaw axis which is connectable with, and disengageable from, an inertial load.

In some embodiments, the dynamic inertia responsive mechanism is reconfigurable in order to define a mechanism-specific moment of inertia.

Some embodiments of the present invention may provide a foot powered immersed reality system, including: an ambulation simulating apparatus, including: a user feet interface; a dynamic inertia mechanism configured to provide an inertial load; and a kinematic connection configured to enable transmission of motion between the dynamic inertia mechanism and the user feet interface; at least one position sensor and at least one pressure sensor which are provided for each of a first and a second foots of the user; and a processor configured to: receive and process a position indicating signal from each of the position sensors and a force indicating signal from each of the pressure sensors to determine characteristics of associated real-time leg motion; and generate images representative of an immersed reality environment that correspond to a real-time position of the first and second foots of the user.

In some embodiments, the ambulation simulating apparatus may include: a first and a second independently movable foot rests, wherein each of the first and second foot rests is coupled to the dynamic inertia mechanism by a corresponding kinematic connection to provide an inertial load; and a first and a second releasable coupling members couplable and decouplable with respect to the corresponding kinematic connection of the first and second foot rests, respectively; wherein the first and second coupling members are set to a coupled position with respect to the corresponding kinematic connection when a downwardly directed foot applied force is transmitted thereto to enable transmission of motion to the dynamic inertia mechanism in response to leg motion, and are set to a decoupled position with respect to the corresponding kinematic connection when the downwardly directed foot applied force is released.

In some embodiments, wherein the dynamic inertia mechanism is configured to at least one store kinematic energy and release the stored kinematic energy via the corresponding kinematic connection to a resting or decelerated foot rest of the first and second foot rests.

In some embodiments, the dynamic inertia mechanism is responsive to at least one of: transversal motion of each of the first and second foot rests; longitudinal foot rest motion of each of the first and second foot rests; and yaw foot rest motion of each of the first and second foot rests.

In some embodiments, the dynamic inertia mechanism is reconfigurable in order to define a mechanism-specific moment of inertia.

In some embodiments, a measure of engagement of each of the first and second coupling members with corresponding kinematic connection of the first and second foot rests is defined by a pressure applied by corresponding foot of a user on corresponding foot rest of the first and second foot rests.

In some embodiments, each of the first and second foot rests includes a pressure sensor configured to measure a pressure applied by the corresponding foot on the corresponding foot rest of the first and second foot rests, and wherein the processor configured to: receive readings from the pressure sensor of each of the first and second foot rests; determine the measure of engagement of each of the first and second coupling members with the corresponding kinematic connection of the first and second foot rests based on the readings of the corresponding pressure sensor; and control the first and second coupling members to engage with the corresponding coupling member of the first and second coupling members according the corresponding determined measure of engagement.

In some embodiments, each of the first and second foot rests includes a vertically displaceable plate with which a corresponding foot is engageable throughout an ambulatory cycle.

In some embodiments, the ambulation simulating apparatus includes a feet tracking and foot rests moving mechanism, the feet tracking and foot rests moving mechanism may include: a first and a second motor assemblies configured to move the first and the second foot rests, respectively, in at least one of a longitudinal direction, a transverse direction in a foot rests plane and about a yaw axis of the respective foot rest; feet tracking sensors configured to track movement of the feet of the user and to generate feet motion data indicative of the feet movement thereof; and the processor is configured to: detect, based on the feet motion data, that at least one foot of the user is not in contact with the respective at least one foot rest of the first and second foot rests; couple at least one coupling member of the first and second coupling members corresponding to the at least one foot rest with corresponding at least one motor assembly of the first and second motor assemblies; control the at least one motor assembly to move the respective at least one foot rest based on the feet motion data; detect, based on the feet motion data, that the at least one foot rest is in contact with the respective at least one foot rest; and decouple the at least one motor assembly from the respective at least one foot rest.

In some embodiments, the ambulation simulating apparatus comprises a backrest configured to constrain at least one of longitudinal, transversal and rotational movement of the user, the backrest is adjustable according to a height of the user and is configured to move in at least one of longitudinal, vertical, transversal, yaw, pitch and roll directions relative to a floor surface.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
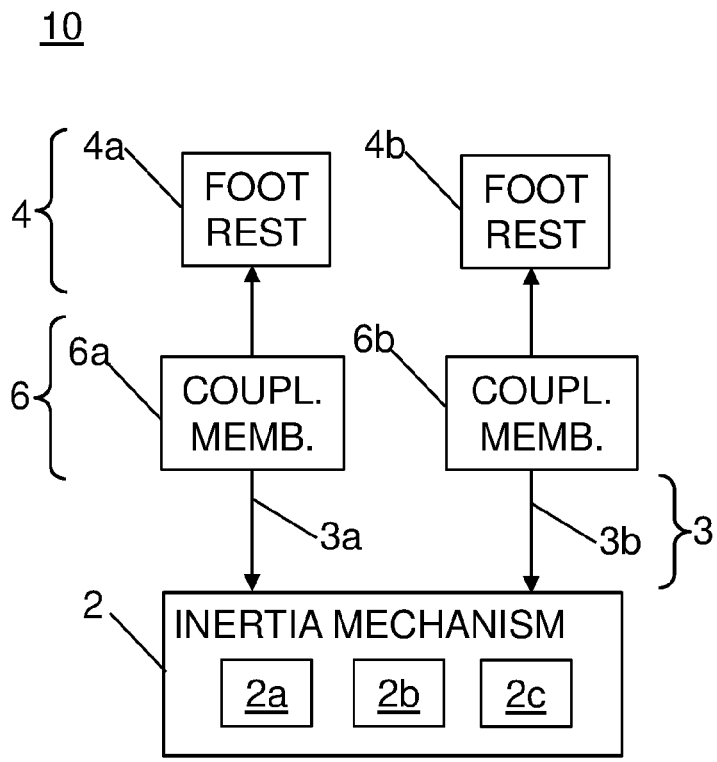
FIG. 1A is a block diagram of an ambulation simulating apparatus, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Some embodiments of the present invention may provide an accurate but inexpensive ambulation simulating apparatus, generally, but not necessarily, in conjunction with an immersive reality system, which enables similar forces to be applied on the feet during ambulatory activities, even though the body mass is substantially stationary, as those that are applied when a person ambulates on a ground surface. The ambulation simulating apparatus may be used for sport or military training, or for rehabilitative purposes.

The inertial load imposed by the dynamic inertia mechanism may be able to counteract either accelerating or decelerating leg motion during each phase of the ambulatory cycle, to provide the user with, for example, a sensation of stability despite interaction with the reduced-friction means that would normally induce slipping action. Such a sensation of stability may be similarly felt during, for example, ambulatory activities when the moving user generates inertial forces that interact with the legs.

FIG. 1A is a block diagram of an ambulation simulating apparatus 10, according to some embodiments of the invention.

Apparatus 10 may include a user feet interface 4 and a dynamic inertia mechanism 2 connected to user feet interface 4 by a kinematic connection 3 to provide an inertial load. Kinematic connection 3 may be configured to enable transmission of motion between the dynamic inertia mechanism and user feet interface 4.

In embodiments shown in FIG. 1A, user feet interface 4 may include two independently movable foot rests—e.g., a first foot rest 4a and a second foot rest 4b (e.g., as shown in FIG. 1A). For example, first foot rest 4a and second foot rest 4b may be connected to dynamic inertia mechanism 2 by a first kinematic connection 3a and a second kinematic connection 3b, respectively. Each user's foot engaged with a corresponding foot rest 4a, 4b may be exposed to inertia reflected from the inertial load via kinematic connections 3a, 3b, respectively.

In some embodiments, each of first and second foot rests 4a, 4b may include a vertically displaceable plate with which a corresponding foot is engageable throughout an ambulatory cycle. This may, for example, enable foot rests 4a, 4b to passively move with the respective foot of the user when the respective foot is not in contact with the respective foot rest.

In some embodiments, apparatus 10 may include releasable coupling members 6—e.g., a first releasable coupling members 6a and a second releasable coupling members 6b. Releasable coupling members 6a, 6b may be couplable and decouplable with respect to corresponding *, 3b, respectively, of said first and second foot rests 4a, 4b, respectively.

First and second coupling members 6a, 6b, respectively, may be set to a coupled position with respect to corresponding kinematic connection 3a, 3b, respectively, when a downwardly directed foot applied force is transmitted thereto to enable transmission of motion to dynamic inertia mechanism 2 in response to leg motion, and are set to a decoupled position with respect to the corresponding kinematic connection 3a, 3b, respectively, when the downwardly directed foot applied force is released.

In some other embodiments, user feet interface 4 may include omnidirectional treadmill.

In some embodiments, dynamic inertia mechanism 2 may include a longitudinally reactive inertia mechanism 2a, a transversally reactive inertia mechanism 2b and a yaw reactive inertia mechanism 2c. Longitudinally reactive inertia mechanism 2a may be responsive to longitudinal motion of foot rests 4a and 4b, transversally reactive inertia mechanism 2b may be responsive to transversal motion of foot rests 4a and 4b and yaw reactive inertia mechanism 2c may be responsive to yaw motion of foot rests 4a and 4b. Kinematic connections 3a, 3b and coupling members 6a, 6b may be configured to provide the inertial load resulted from each of the longitudinal motion, transverse motion and yaw motion, independently for each of foot rests 4a, 4b. For example, when at least one of the feet of the user does not apply a downwardly directed foot force onto the respective foot rest, the feet of the user are independent from each other. Yet, when both feet of the user apply downwardly directed foot force on the foot rests 4a, 4b, the feet of the user are connected to each other through the dynamic inertia mechanism 2 (e.g., just like it would be on the ground).

In some embodiments, a measure of engagement of each of coupling members 6a, 6b with corresponding kinematic connections 3a, 3b, respectively, may be set according to a pressure applied by the foot of the user on corresponding foot rest 4a, 4b, respectively. For example, the higher the pressure applied by the foot of the user on corresponding foot rest 4a, 4b, the stronger the engagement of the corresponding coupling member 6a, 6b, respectively, with the corresponding kinematic connection 3a, 3b, respectively. This may, for example, enable simulation of a measure of contact of the foot of the user with a floor/ground surface. For example, if the user has slightly dragged the foot on the floor/ground surface, the measure of engagement of corresponding coupling member 6a, 6b with corresponding kinematic connection 3a, 3b, respectively, may be weaker as compared to the case when the user fully stands on the corresponding foot.

Apparatus 10 may, for example, provide the sensation of stability during periods of either accelerating or decelerating leg motion. Apparatus 10 may enable similar forces to be applied on the feet of the user during ambulatory activities (e.g., even though the body mass is substantially stationary) as those that are applied when a person ambulates on a ground surface.

Figure 1B:
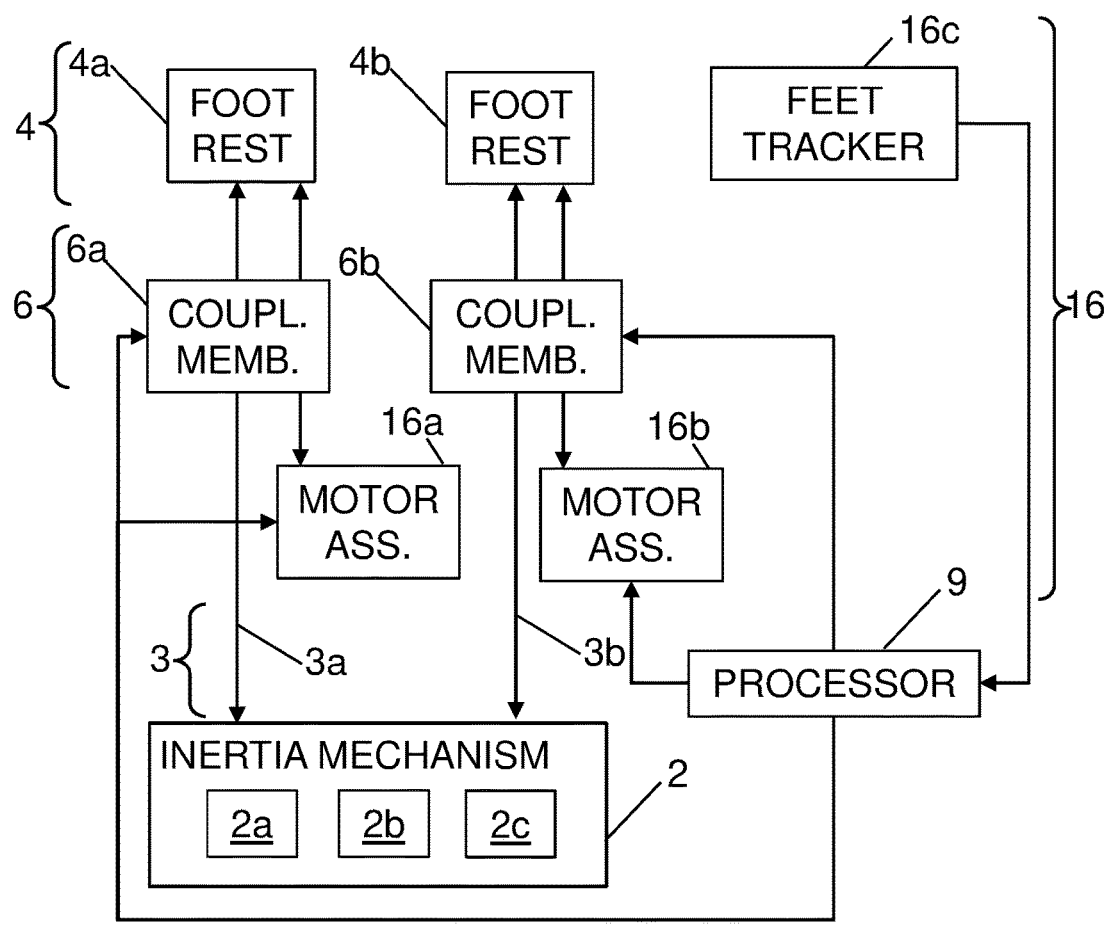
FIG. 1B is a block diagram of an ambulation simulating apparatus including a feet tracking and foot rests moving mechanism, according to some embodiments of the invention.

FIG. 1B is a block diagram of an ambulation simulating apparatus 10 including a feet tracking and foot rests moving mechanism 16, according to some embodiments of the invention.

In some embodiments, ambulation simulating apparatus may include a feet tracking and foot rests moving mechanism 16. Feet tracking and foot rests moving mechanism 16 may include a first and a second motor assemblies 16A, 16b, respectively. First and second motor assemblies 16a, 16b may be configured to move first and the second foot rests, 4a, 4b, respectively, in at least one of a longitudinal direction, a transverse direction in a foot rests plane and about a yaw axis of the respective foot rest.

In some embodiments, feet tracking and foot rests moving mechanism 16 may include a feet tracker 16c. Feet tracker 16c may be configured to track movement of the feet of the user and to generate feet motion data indicative of the feet movement thereof. In some embodiments, feet tracker 16c may include one or more optical sensors. In some embodiments, feet tracker 16c may include one or more analog sensors. In some embodiments, feet tracker 16c may include two joystick sensors each in one of first and second foot rests 4a, 4b. The joystick sensors may be engageable with the feet of the user using, for example, a rope/wire, etc. The rope/wire may be, for example, retractable rope/wire to enable free vertical movement of the user feet.

In some embodiments, ambulation simulation apparatus 10 may include a processor 9. Processor 9 may detect, based on the feet motion data, that at least one foot of the user is not in contact with the respective at least one foot rest of first and second foot rests 4a, 4b. Processor 9 may couple at least one coupling member of first and second coupling members 6a, 6b corresponding to the at least one foot rest with corresponding at least one motor assembly of first and second motor assemblies 16a, 16b. Processor 9 may control the at least one motor assembly to move the respective at least one foot rest based on the feet motion data. Processor 9 may detect, based on the feet motion data, that the at least one foot rest is in contact with the respective at least one foot rest. Processor 9 may decouple the at least one motor assembly from the respective at least one foot rest and couple the respective at least one coupling member 6a, 6b to respective at least one kinematic connection of first and second kinematic connections 3a, 3b and to dynamic inertia mechanism 2.

Figure 1C:
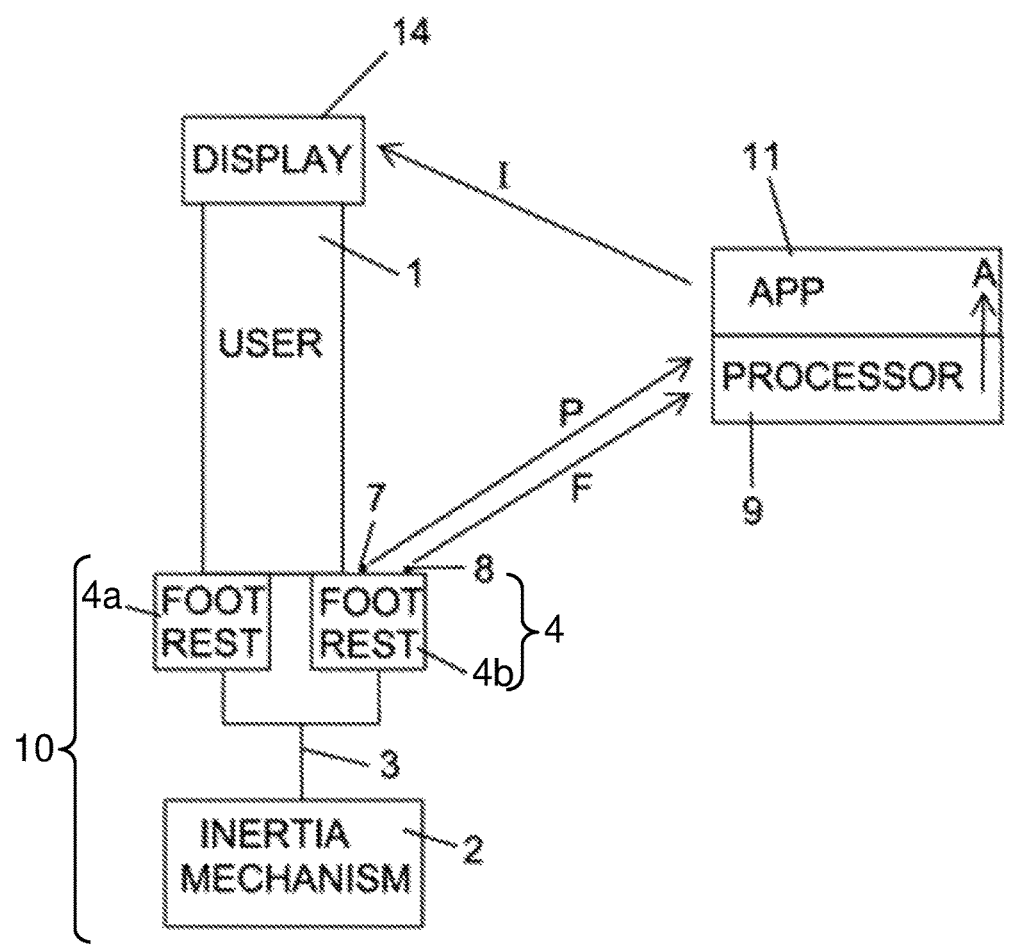
FIG. 1C is a block diagram of a foot-powered immersive reality system, according to some embodiments of the invention.

FIG. 1C is a block diagram of a foot-powered immersive reality system 10' according to some embodiments of the invention.

Immersive reality system 10' may be at least one of an augmented reality (AR) system, virtual reality (VR) system, mixed reality (MR) system, cross reality (XR) system and/or any combination thereof.

System 10' may include apparatus 10 (e.g., including user feet interface 4 (e.g., such as two independently movable foot rests 4a and 4b or omnidirectional treadmill), and a dynamic inertia mechanism 2 connected to foot rests 4a and 4b by a kinematic connection 3 to provide an inertial load, as described above with respect to FIG. 1A). Each foot engaged with a corresponding foot rest is able to be exposed via kinematic connection 3 to inertia reflected from the inertial load, to provide the sensation of stability during periods of either accelerating or decelerating leg motion. In various embodiments, at least one position sensor 7 and at least one pressure sensor 8 are provided with each foot rest 4a, 4b and/or for each of the feet of the user. Processor 9 on which is running an immersed reality application 11 receives a position indicating signal P from each sensor 7 and a force indicating signal F from each sensor 8. The received data may be processed by processor 9 to determine characteristics of the associated real-time leg motion.

In embodiments having, for example, omnidirectional treadmill as user feet interface 4, processor 9 may determine characteristics of the associated real-time leg motion merely based on position sensors 7, without a need in pressure sensors 8, as the connection with dynamic inertia mechanism 2 is inherently done by applying downwardly directed feet force on the omnidirectional treadmill running floor.

Processor 9 may transmit application-readable data A associated with the real-time leg motion to application 11. Application 11 may convert data A to immersed reality image data. Application 11 may transmit immersed reality image data I to a display device 14 visible to the user 1. Display device 14 may generate the immersed reality images to indicate a change in immersed reality space, when relevant. A typical display device 14 may be, for example, a headset worn by the user 1.

Although processor 9 is shown to be positioned remotely to foot rests 4a and 4b and to headset 14, such as mounted in a separate computerized device, it will be appreciated that processor 9 may be bodily mounted by user 1, such as within a headset, one of the foot rests 4a and 4b, or a dedicated mounting device.

System 10' utilizing ambulation simulating apparatus 10 may provide a real-time foot-powered, inertia responsive immersed reality system.

Figure 2:
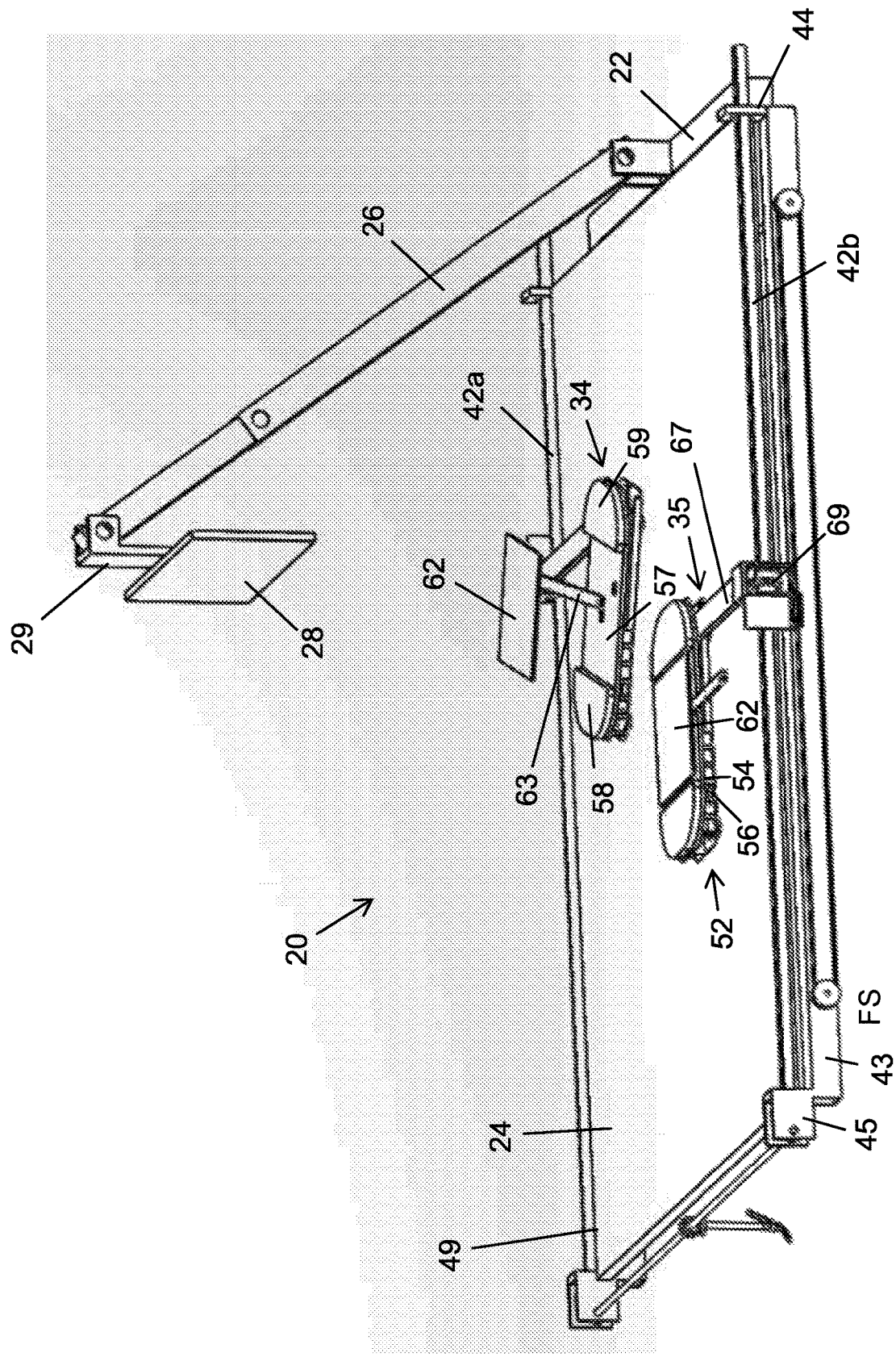
FIG. 2 and FIG. 3 illustrate two different perspective views from above, respectively, of the mechanical apparatus of ambulation simulating apparatus, according to some embodiments of the invention.

FIG. 2 illustrates the mechanical apparatus of ambulation simulating apparatus 20 according to some embodiments of the invention.

In some embodiments, apparatus 20 may include a horizontal supporting frame 22 for supporting a rigid surface 24 on top of which a user may perform ambulatory activities, for example during generation of immersive reality image data as described above with respect to FIG. 1B. Rigid surface 24 may be fixedly connected to frame 22. In some embodiments, the user may perform ambulatory activities directly on the floor surface (e.g., without a need in rigid surface 24 and/or supporting frame 22).

In some embodiments, apparatus 20 may include a backrest 28. Backrest 28 may be vertically oriented. Backrest 28 may be connected to frame 22 by a rod 26. In some embodiments, rod 26 may be telescopically extendable rod 26. Rod 26 may have rectangular or circular cross section, and may be pivotally connected to, for example, a longitudinal end of frame 22 that may longitudinally protrude from surface 24. A backrest 28 may be connected to one end of rod 26 by means of, for example, holder 29. Backrest 28 may be used for constraining longitudinal, transversal or rotational user movement of the user, such as by means of a strap attached to both the user and to backrest 28. Backrest 28 may be displaceable vertically relative to holder 29, horizontally relative to holder 29 and/or pivotally relative to rod 26. This may, for example, provide the user with more realistic simulation of ambulatory activity. A user-beneficial rod height and orientation may be set. By virtue of the constraining action provided by backrest 28, the size of surface 24 may be limited to a compact surface area of for example 1 square meter, yet is suitable for performing ambulatory activities and for enabling the generation of realistically changing immersed reality images.

Other means for constraining an upper body part of a user, such as the pelvic area, may also be employed.

As referred to herein, "longitudinal" is the direction away from backrest 28, generally parallel to the long side of surface 24, and a "transversal" direction is generally perpendicular to the longitudinal direction, for example ranging from 30-150 degrees relative to the longitudinal direction.

In some embodiments, the ambulatory activities may be made possible by two independently and multi-dimensionally movable foot rests 34 and 35. Each of foot rests 34 and 35 may be afforded specified degrees of freedom, for example in the longitudinal, transversal, vertical directions, as well as rotation about a yaw, tilt and/or pitch axes. It is understood that foot rotation about a yaw axis enables simulation of rotation of the entire body.

In some embodiments, the ambulatory activities may be made possible by an omnidirectional treadmill.

In some embodiments, two longitudinally extending shafts 42a and 42b may be each rotatably mounted within a pair of opposed brackets 44 and 45 upwardly protruding from a corresponding transversal end 49 of surface 24, and may be used for facilitating longitudinal displacement of foot rests 34 and 35, respectively. Opposed brackets 44 and 45 may be integrally formed with a corresponding side frame element 43 connected to the transversal end 49 of surface 24. Side frame element 43 may be adapted to rest on an underlying floor surface FS, such that surface 24 is positioned above floor surface FS.

In some embodiments, each elongated foot rest may include a lower slider member 52 which is configured with a cage 54 within which one or more slidable elements 56 are movably mounted, so as to be in slidable contact with surface 24. Each slidable element 56 may be for example an omnidirectional wheel having a plurality of rollers fitted in its circumference to facilitate lateral movement in addition to the conventional rolling or turning movement, a slide plate with a low coefficient of friction, or a caster wheel. In some embodiments, a planar protective surface 57 may be connected to cage 54 from above, and two spaced abutments 58 and 59 may protrude upwardly from surface 57 at the ends of the foot rest.

In some embodiments, a vertically displaceable plate 62, to which a user's foot is attached for example by a dedicated strap, is connected to, for example, a central region of surface 57 by a linkage 63 that facilitates vertical displacement, and is sufficiently sturdy to support the weight of a user's foot when raised. When plate 62 is set to a lowered position, it abuts surface 57 and is substantially coplanar with the upper surface of abutments 58 and 59. A pressure sensor may be mounted on each of abutments 58 and 59 in order to detect a step-down condition, as will be described hereinafter.

Figure 8:
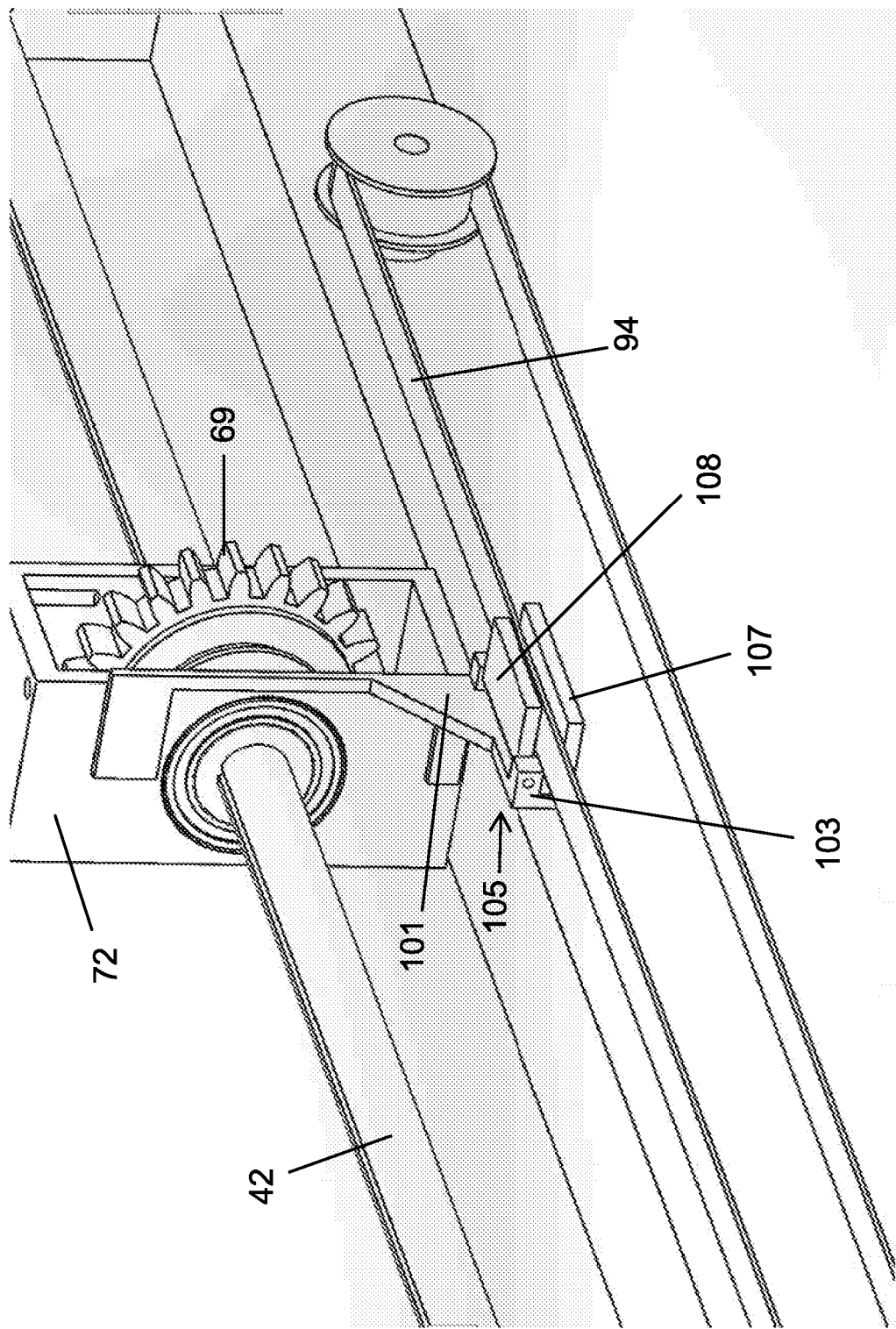
FIG. 8 and FIG. 9 are a perspective view from the front of the pinion enclosure of FIG. 5, showing a coupling member set to coupled and decoupled positions, respectively, according to some embodiments of the invention.

The vertical displacement of plate 62 of foot rests 34, 35 may, for example, enable the feet move up and down freely while keeping the corresponding foot rest mechanically connected to the foot by plate 62 and passively follow the foot position in, for example, horizontal and yaw directions. As long as the coupling members 105 (e.g., described below with respect to FIGS. 8 and 9) are disconnected from the inertial load, the foot may move freely with minimal drag of friction.

In some embodiments, in order to effect transversal motion, a toothed rack element 67, e.g., of rectangular cross section, also shown in FIG. 5 below, may be used. Rack element 67 may be connected to, for example, the underside of a linear guide element 68 which is introducible through a linearly extending element 66 fixed to a member 72, which is displaceable relative to shaft 42. Element 66 may pass through, and be in force transmitting relation with, the cage 54 of each foot rest, while also being intermeshed with a pinion 69 mounted around the corresponding shaft 42, for example loosely mounted around shaft 42. When a foot of the user is moved transversally and a downward force is applied to the foot rest, rack element 67 is similarly displaced transversally in response and causes the corresponding longitudinally extending shaft 42 to be rotated.

Another type of elongated element passing through, and in force transmitting relation with, the cage 54 of each foot rest may be used instead of a rack element (e.g., such as articulated arm 130 described below with respect to FIGS. 10 and 11), as well as a different type of transmission. For example, pulleys and belts may be used. The pivotal connection between the elongated element and the cage may constitute the yaw axis. The yaw axis may be connectable with, and disengageable from, a load such as an inertia mechanism.

Figure 3:
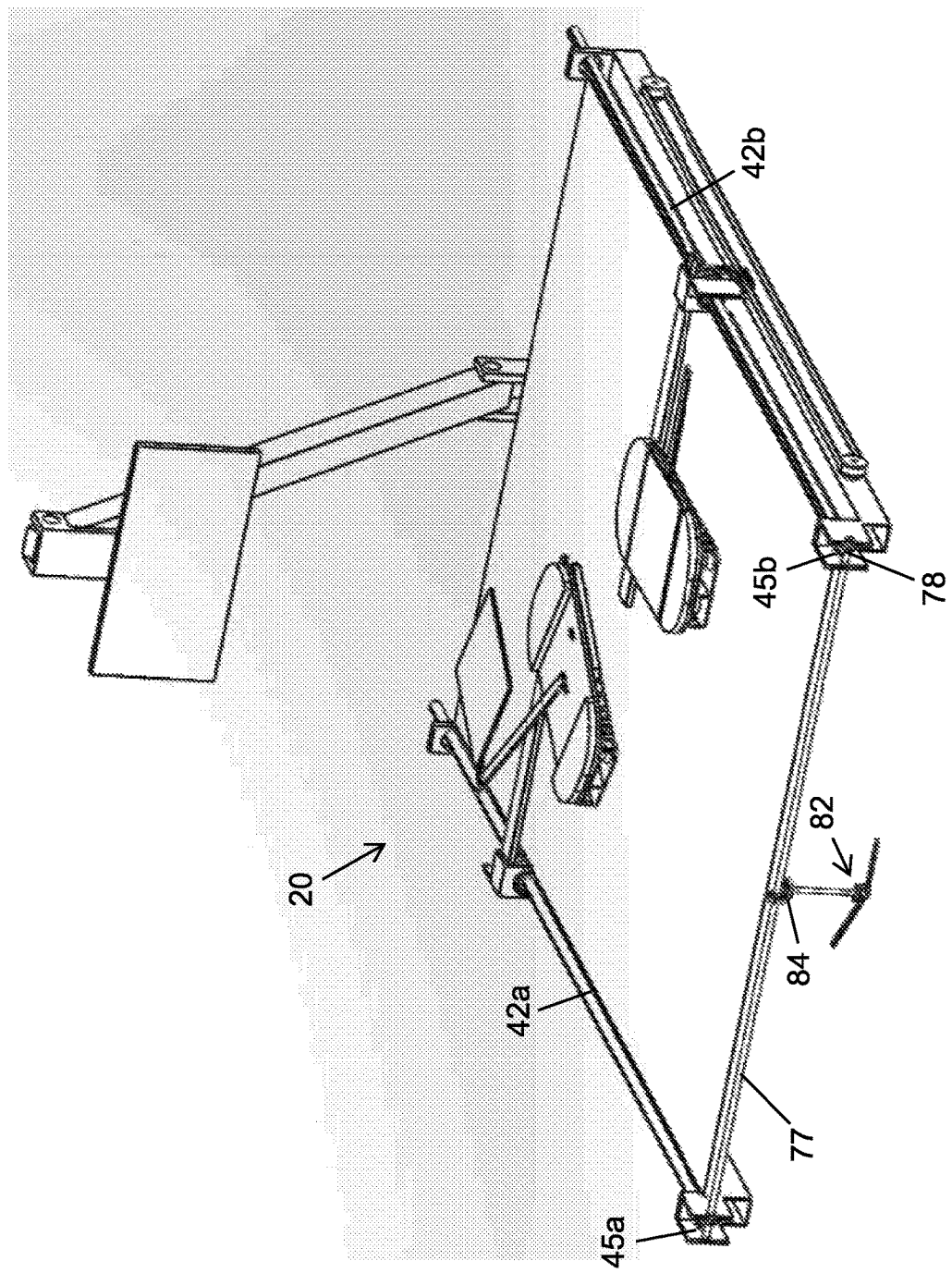

In embodiments shown in FIG. 3, a transversally extending shaft 77 is rotatably mounted in the two distal brackets 45a and 45b, and a bevel gear 78 mounted at each end of shaft 77 is intermeshed with a mating bevel gear mounted at the end of the corresponding longitudinally extending shaft 42. Thus rotation of the corresponding longitudinally extending shaft 42 transmits motion to transversally extending shaft 77 and causes the latter to rotate. In response, a dynamic inertia mechanism 82 kinematically connected to transversally extending shaft 77, for example by a set of bevel gears 84, is caused to rotate and store kinetic energy. In some embodiments, a belt may be used instead of a transversally extending shaft 77.

Dynamic inertia mechanism 82 may be operational in two modes. In a first loading mode, inertia mechanism 82 stores kinetic energy in response to active user leg motion. In a second releasing mode, the stored kinetic energy is released following deceleration of the user leg motion, being transmitted from transversally extending shaft 77 to the two longitudinally extending shafts 42a and 42b. This released kinetic energy, which is associated with reflected inertia, thus applies a force onto a resting or decelerated foot rest that opposes subsequent active user leg motion in a fashion that is analogous to the reactive force applied by an underlying ground surface to the feet of a walker.

In some embodiments, bevel gears 78 may be configured to cause transversally extending shaft 77 to rotate in the same first rotational direction when one or both of shafts 42a and 42b is caused to rotate in response to a transversally outward movement of the corresponding foot rest, e.g., towards the corresponding transversal end 49 of surface 24 (e.g., as shown in FIG. 2). Transversally extending shaft 77 may similarly rotate in the same second rotational direction when one or both of shafts 42a and 42b are caused to rotate in response to a transversally inward movement of the corresponding foot rest which is opposite to transversally outward movement.

It will be appreciated that both shafts 42a and 42b may rotate upon rotation of transversally extending shaft 77 as a result of their kinematic connection with transversally extending shaft 77. This simultaneous rotation causes resistance to a certain degree to a second leg in response to leg motion initiated by the first leg, although the resistance is of a smaller magnitude than the resistance provided by dynamic inertia mechanism 82 in response to a decelerating leg motion initiated by the first leg.

Additional kinetic energy may be stored by dynamic inertia mechanism 82 when one or both of shafts 42a and 42b is caused to rotate in the same direction as the rotational direction to which it was subjected during the previous transversal displacing operation. Upon termination of a transversal displacing operation by one or both foot rests, dynamic inertia mechanism 82 may oppose the change in velocity by transmission of reflected inertia.

In response to operation of the independently movable foot rests, a first foot rest is displaced to generate an inertial load during a first transversal displacing operation. Following termination of the first transversal displacing operation, the inertial load is reflected to the second foot rest via the corresponding longitudinally extending shaft prior to performance of a second transversal displacing operation.

Figure 4:
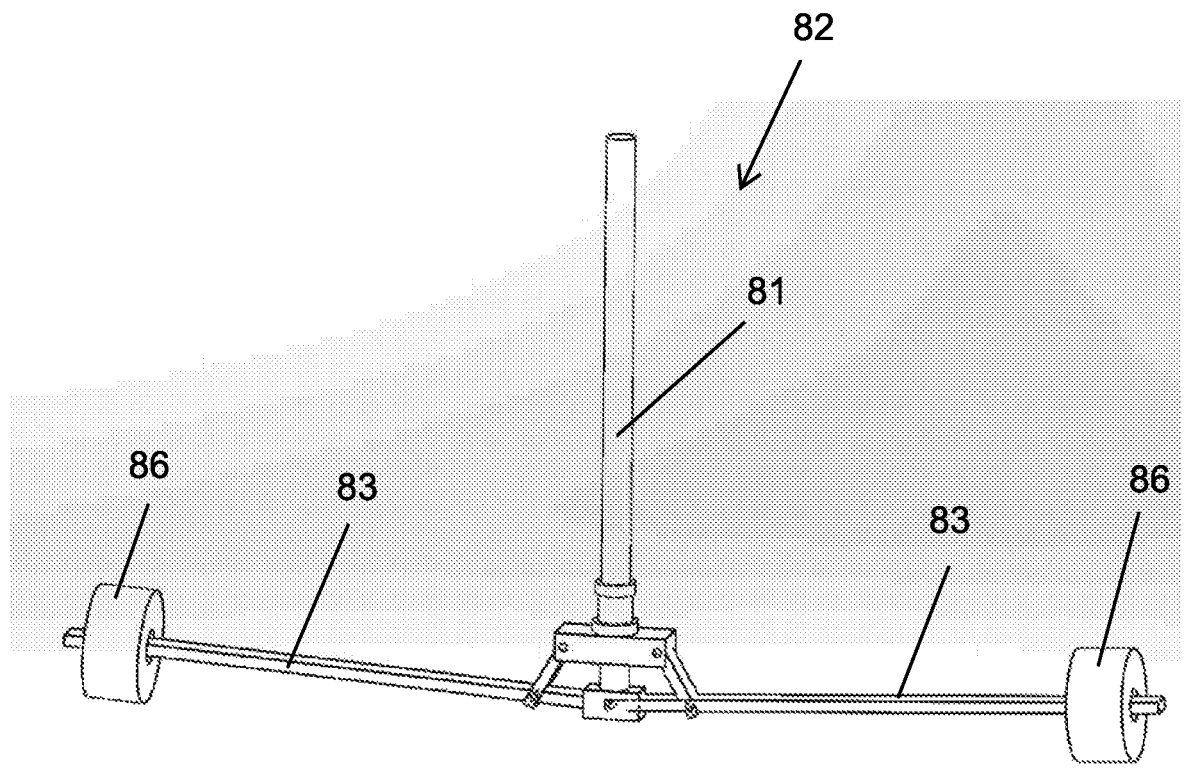
FIG. 4 is a front view of a dynamic inertia mechanism, according to some embodiments of the invention.

An exemplary structure of dynamic inertia mechanism 82 is illustrated in FIG. 4. Dynamic inertia mechanism 82 may include a rotatable vertical shaft 81 that is kinematically connected to the transversally extending shaft by a set of bevel gears, and two oppositely directed bars 83, each of which provided with an equal weight 86. Bars 83 are pivotally connected to shaft 81, so that their angular spacing from shaft 81 may be adjusted, in order to, for example, define the moment of inertia of inertia mechanism 82. The moment of inertia may be defined in such a way that the reflected inertial load that is to be derived from the associated stored kinetic energy and/or changes in momentum may be equal to an anticipated foot applied force from an actual moving body. In some embodiments, at least one of a mass of weights 86, a distance of weights 86 from bar 81, angular spacing of weights 86 (and/or bars 83) from shaft 81 and a rotational speed of shaft 81/weights 86 may be defined based on at least one of a weight, a height of the user and a desired inertial load to be provided. In some embodiments, weights 86 may be symmetrically disposed with respect to bar 81. In some embodiments, the mass of weights 86 may be changed by, for example, injecting/removing a liquid from a center of rotation thereof (e.g., bar 81) into/from pockets in weights 86.

Figure 5:
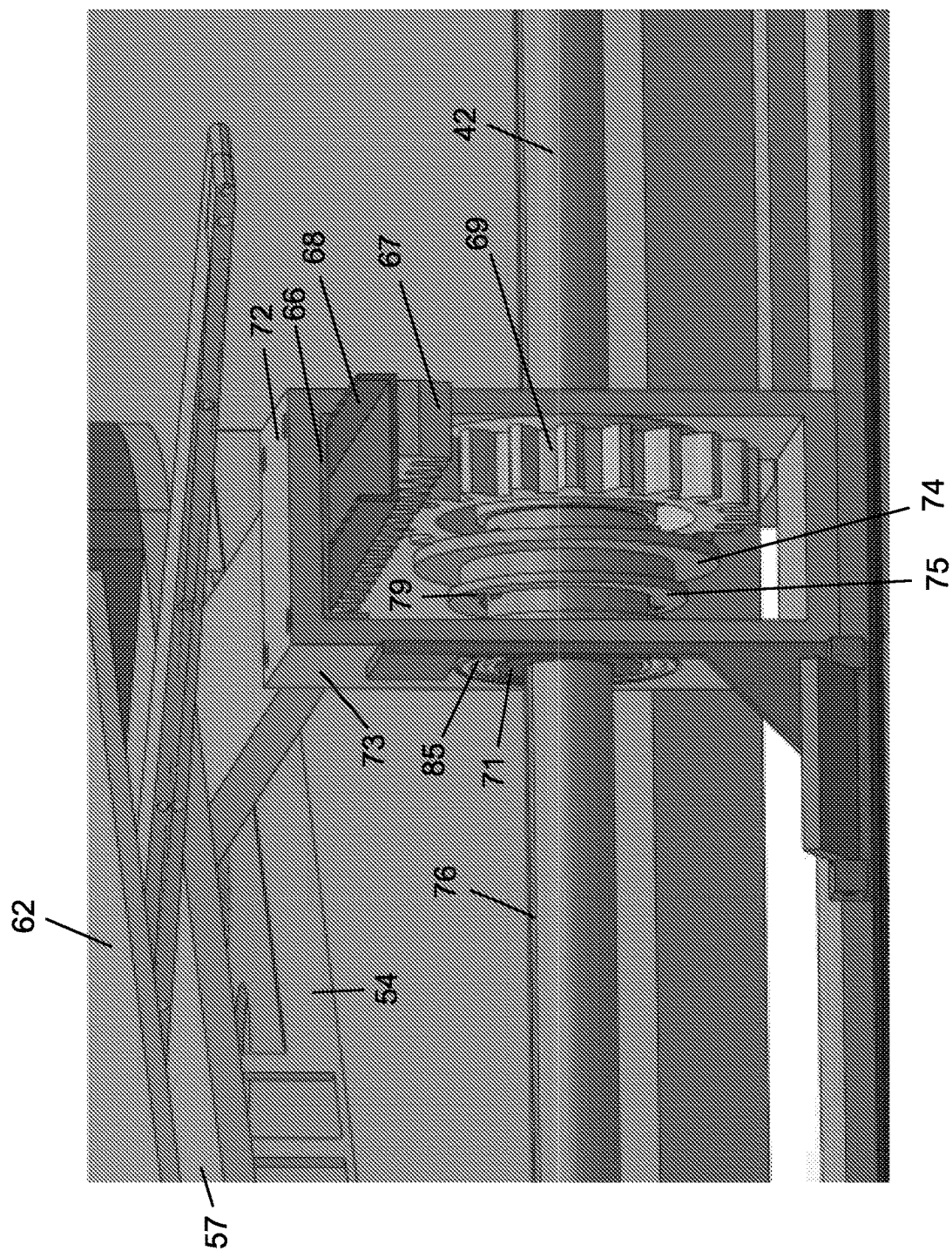
FIG. 5 is a perspective view from the side of a pinion enclosure, according to some embodiments of the invention.
Figure 6:
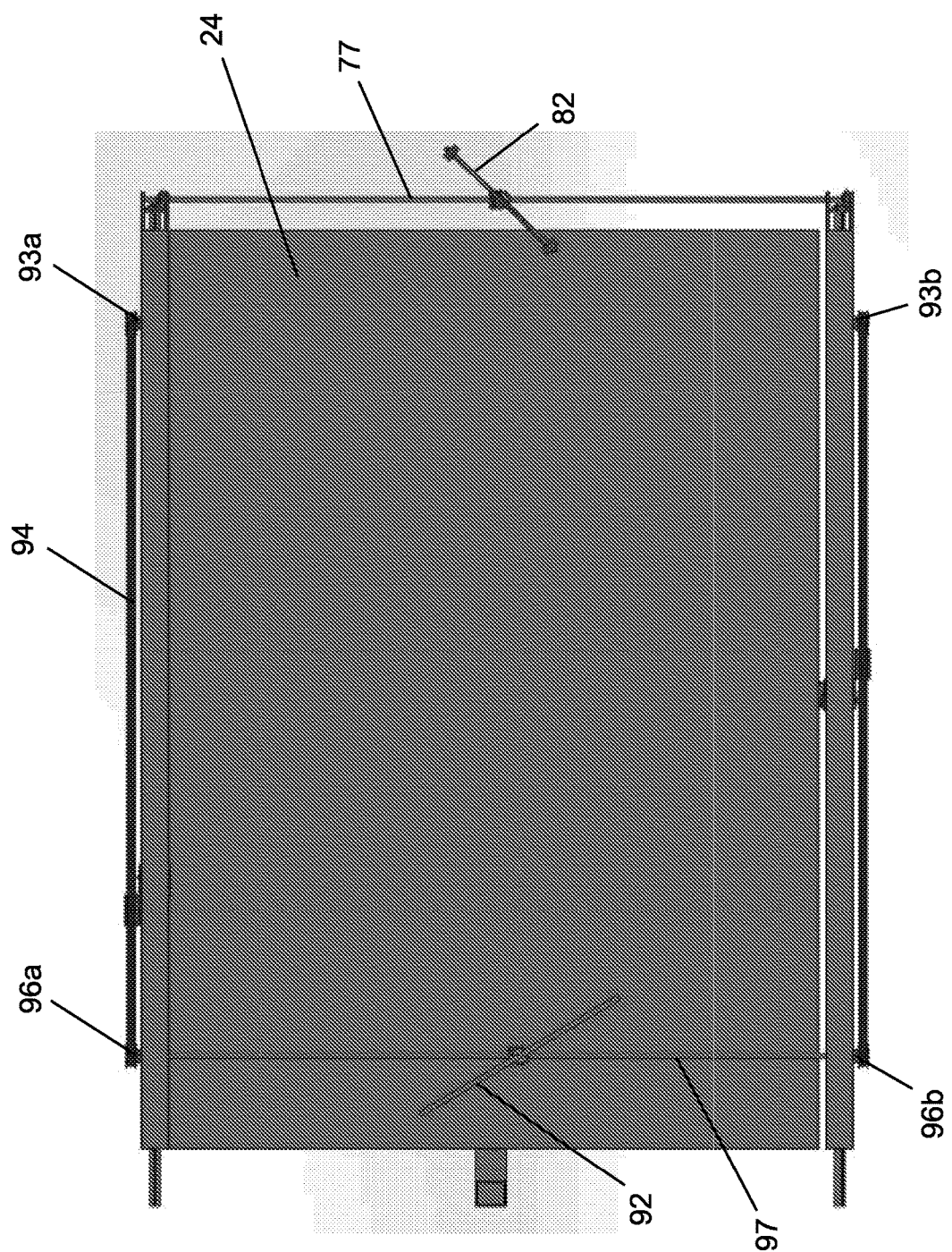
FIG. 6 is a bottom view of ambulation simulating apparatus, according to some embodiments of the invention.
Figure 7:
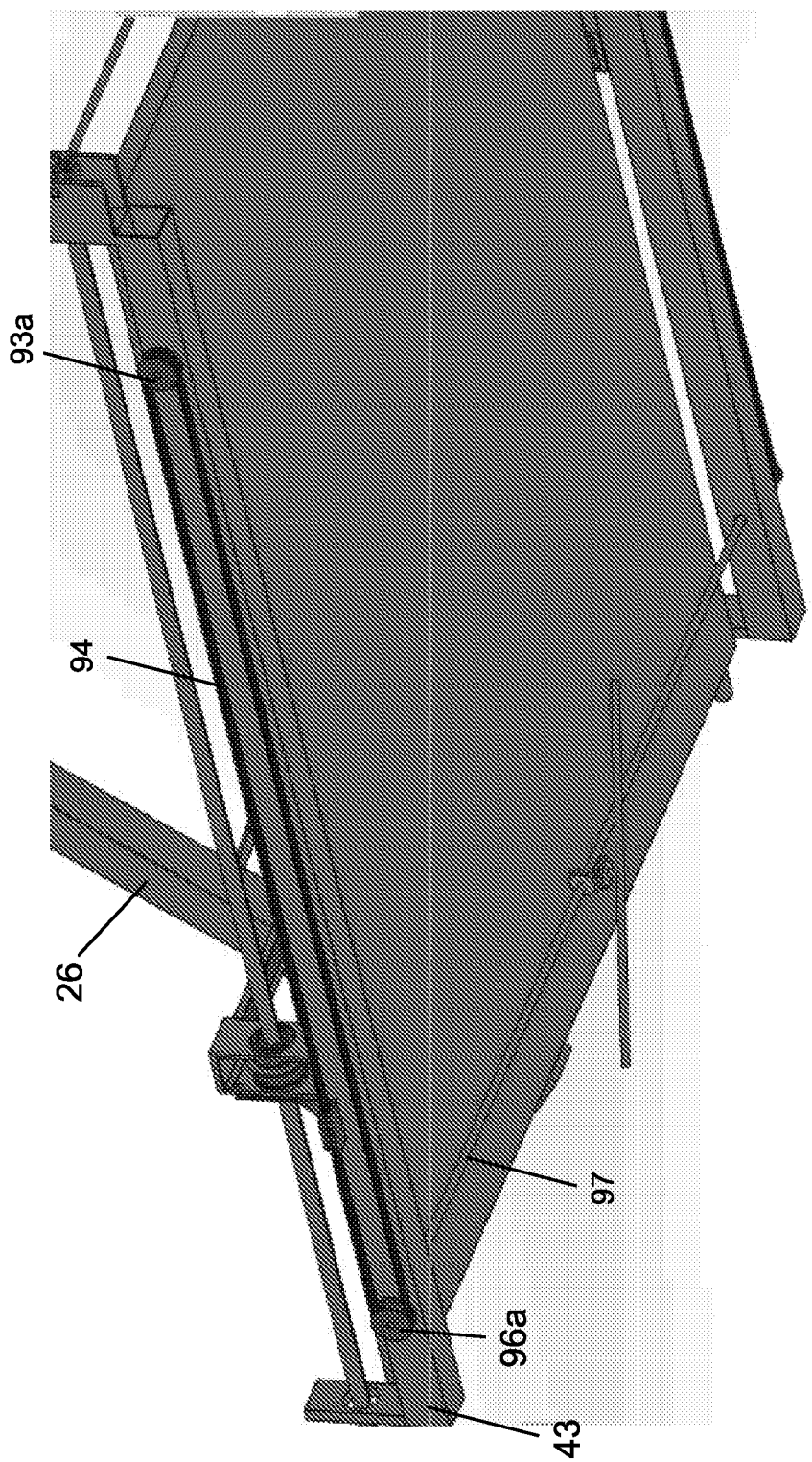
FIG. 7 is a perspective view from the bottom of a portion of the ambulation simulating apparatus of FIG. 6, according to some embodiments of the invention.

In embodiments shown in FIG. 5, a pinion enclosure 72, which may be, e.g., rectilinear, may include a clutch mechanism 74 adapted to releasably couple pinion 69 and longitudinally extending shaft 42.

In some embodiments, longitudinally extending shaft 42 may be configured with one or more splines 76 and pinion 69, which is continuously intermeshed with rack element 67, is loosely mounted around spline shaft 42. An elongated spline nut 71, e.g., functioning as a linear guide in the longitudinal direction, whose length is approximately equal to that of enclosure 72, is mounted on spline shaft 42. Spline nut 71 and spline shaft 42 may be able to rotate in unison, yet spline nut 71 may be able to be displaced longitudinally relative to spline shaft 42. In some embodiments, a bearing 85 mounted within each side wall 73 of pinion enclosure 72 enables rotation of spline nut 71 relative to pinion enclosure 72.

In some embodiments, clutch mechanism 74 may be couplable to pinion 69 and may be configured with an annular coupling ring 75. Coupling ring 75 may be, for example, formed with one or more grooves 79 radially extending from its radially inward edge for fixation with spline nut 71, so that clutch mechanism 74 will rotate together with spline nut 71. When a foot applied step-down force is received by protective surface 57 or plate 62 of a foot rest (e.g., as shown in FIG. 2), the force is transmitted downwardly onto rack element 67, causing clutch mechanism 74 to be coupled pinion 69. Through the engagement between clutch mechanism 74 and pinion 69, transversal foot movement causes corresponding transversal displacement of rack element 67 and rotation of pinion 69 and of spline shaft 42. When the foot applied force is released, clutch mechanism 74 becomes separated from pinion 69.

The engagement between nut spline 71 and spline shaft 42 may facilitate longitudinal displacement of pinion enclosure 72 along shaft 42 in response to longitudinal movement of the user's foot.

The ability of causing rotation of spline shaft 42 during step-down conditions may advantageously facilitate selective transmission of a reflected inertial load. That is, the loading mode is made possible only during step-down conditions and the releasing mode is carried out during the absence of a step-down condition, e.g., when the corresponding leg is raised. By virtue of alternating initiation of the loading mode and of the releasing mode, the user is able to simulate regular ambulatory activities by being periodically exposed to a reactive force.

In embodiments shown in FIGS. 6-9, ambulation simulating apparatus 20 may include a dynamic inertia mechanism 92 which is reactive to the user's longitudinal foot displacement. Longitudinally reactive inertia mechanism 92 may be identical to transversally reactive inertia mechanism 82, and may be kinematically connected to a transversally extending shaft 97 positioned, for example, below surface 24 and positioned, for example, proximally relative to transversally extending shaft 77 to which transversally reactive inertia mechanism 82 is connected.

In some embodiments, shaft 97 may be connected to two transversally spaced proximal pulleys 96*a* and 96*b*, for example in order to facilitate rotation of shaft 97. An endless belt 94 ay be looped over each proximal pulley and over a corresponding distal pulley 93*a*, 93*b*, the latter being rotatably mounted in, for example, the corresponding side frame element 43. When a belt 94 is longitudinally driven in response to a foot applied force, each corresponding pair of proximal and distal pulleys are caused to rotate. Shaft 97 is consequently caused to rotate and transmits motion to longitudinally reactive inertia mechanism 92.

When both transversally reactive inertia mechanism 82 and longitudinally reactive inertia mechanism 92 are in use, the user's legs are each exposed to reflected inertia that is transmitted from both the transversal and longitudinal directions, to provide more realistic ambulatory activities.

In some embodiments, if so desired, only one of the transversally reactive inertia mechanism 82 and longitudinally reactive inertia mechanism 92 may be employed.

In some embodiments, longitudinal displacement of endless belt 94 may be coordinated with longitudinal displacement of pinion enclosure 72 by means of, for example, releasable coupling member 105. In some embodiments, a spline shaft may be used instead of belt 94. Coupling member 105 may be longitudinally spaced, e.g., distally spaced, from pinion enclosure 72 by connecting element 101, which may be vertically oriented and configured with an oblique edge. In some embodiments, coupling member 105 may include a body 103 provided with bottom fixed horizontal plate 107 adapted to be positioned slightly below belt 94 and upper plate 108, which is pivotally connected to body 103.

When the weight of the user's leg is concentrated on a foot rest, the downwardly directed foot applied force is transmitted through rack element 67 (e.g., as shown in FIG. 5) to cause engagement between clutch mechanism 74 and spline shaft 42, so that subsequent longitudinal foot motion will cause corresponding longitudinal motion of pinion enclosure 72 and subsequent transversal foot motion will cause rotation of longitudinally extending shaft 42. The downwardly directed foot applied force is additionally transmitted through shaft 42, pinion enclosure 72, connecting element 101 and body 103, so that upper plate 108 will be set to a first pivoted position shown in FIG. 8 at which it is substantially parallel to lower plate 107 and engaged with belt 94. While coupling member 105 is engaged with belt 94, longitudinal motion of pinion enclosure 72 causes corresponding longitudinal motion of belt 94, and rotation of shaft 97 and dynamic inertia mechanism 92.

Figure 9:
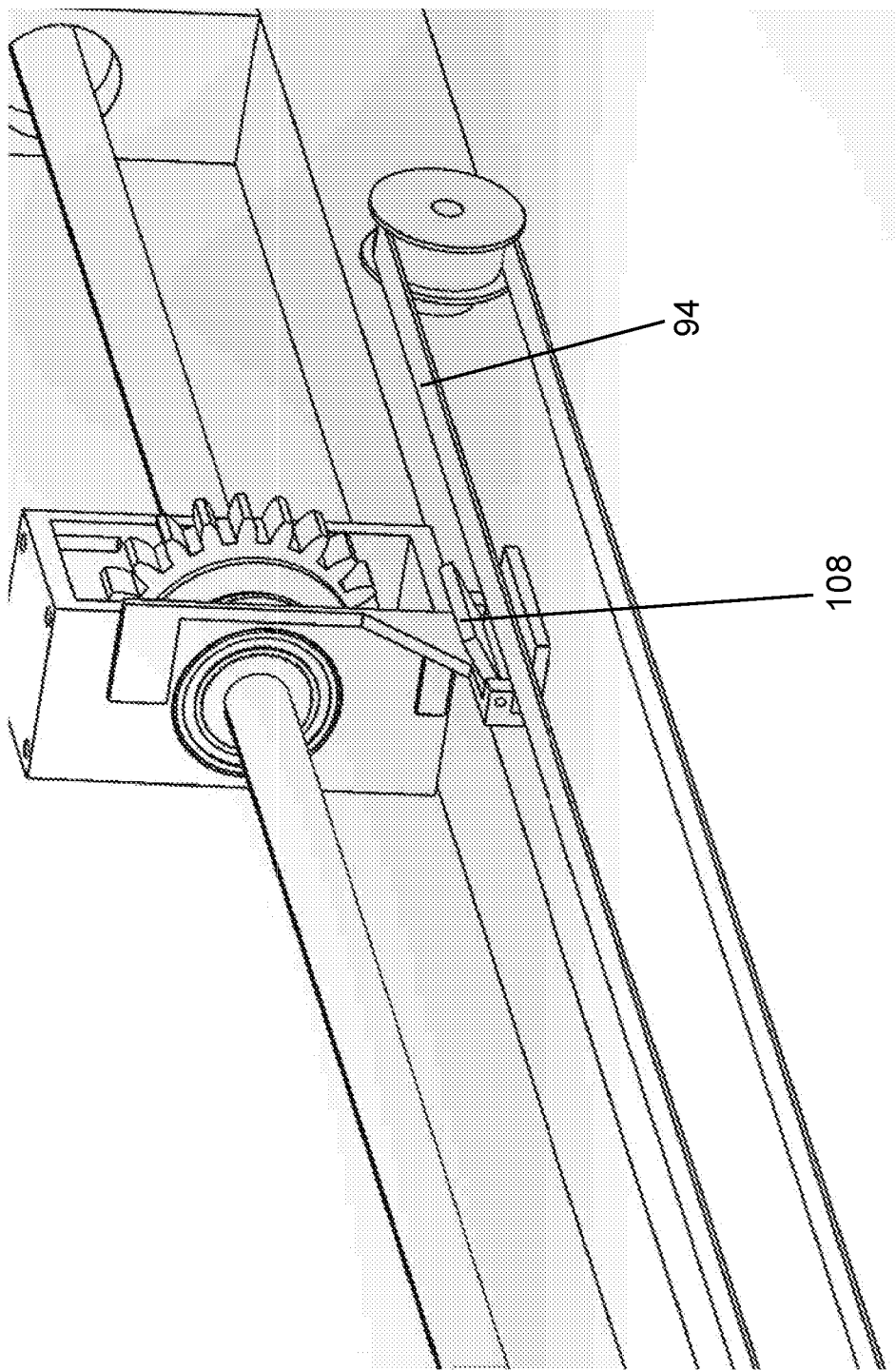

When the user's leg is raised and a downwardly directed foot applied force ceases to be transmitted through the rack element, upper plate 108 will be set to a second pivoted position shown in FIG. 9 at which it is decoupled from belt 94.

In some embodiments, coupling member 105 may be electronically actuated. Upon detecting step-down conditions, pressure sensor 7 (e.g., as shown in FIG. 1) may transmit a signal to processor 9, which in turn may command actuation of coupling member 105 so as to engage with belt 94. Upon detecting step-up conditions, pressure sensor 7 (e.g., as shown in FIG. 1) may transmit a signal to processor 9, which in turn may command actuation of coupling member 105 so as to decouple from belt 94.

In some embodiments, a measure of engagement of each of coupling members 105 with corresponding belt 94 may be set according to a pressure applied by the foot of the user on corresponding foot rest as measured by pressure sensor 7. For example, the higher the pressure applied by the foot of the user on corresponding foot rest, the stronger the engagement of the corresponding coupling member 105 to the corresponding belt 94. This may, for example, enable simulation of a measure of contact of the foot of the user with a floor surface. For example, if the user has slightly dragged its foot on the floor surface, the measure of engagement of corresponding coupling member 105 with corresponding belt 94 may be weaker as compared to the case when the user has fully stand on the corresponding foot.

In some embodiments, clutch mechanism 74 may be configured to adjust the measure of engagement of each of coupling members 105 with corresponding belt 94 according to a pressure applied by the foot of the user.

In some embodiments, an endless belt connected to a pulley may be employed in lieu of the rack and pinion arrangement or in lieu of a spline shaft arrangement.

Figure 10:
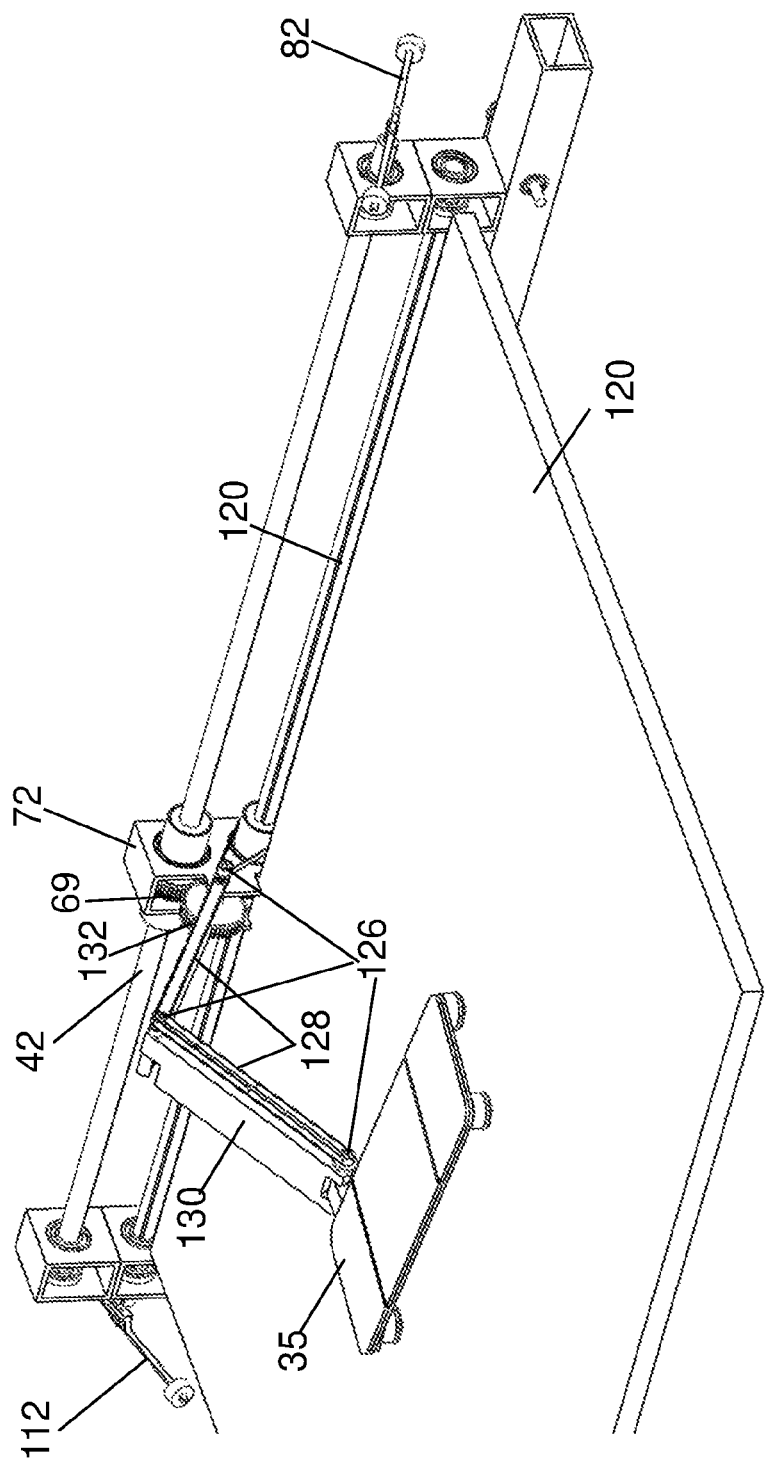
FIG. 10 and FIG. 11 are perspective schematic views of ambulation simulating apparatus including a dynamic inertia mechanism which is reactive to the user's yaw foot displacement, according to some embodiments of the invention.
Figure 11:
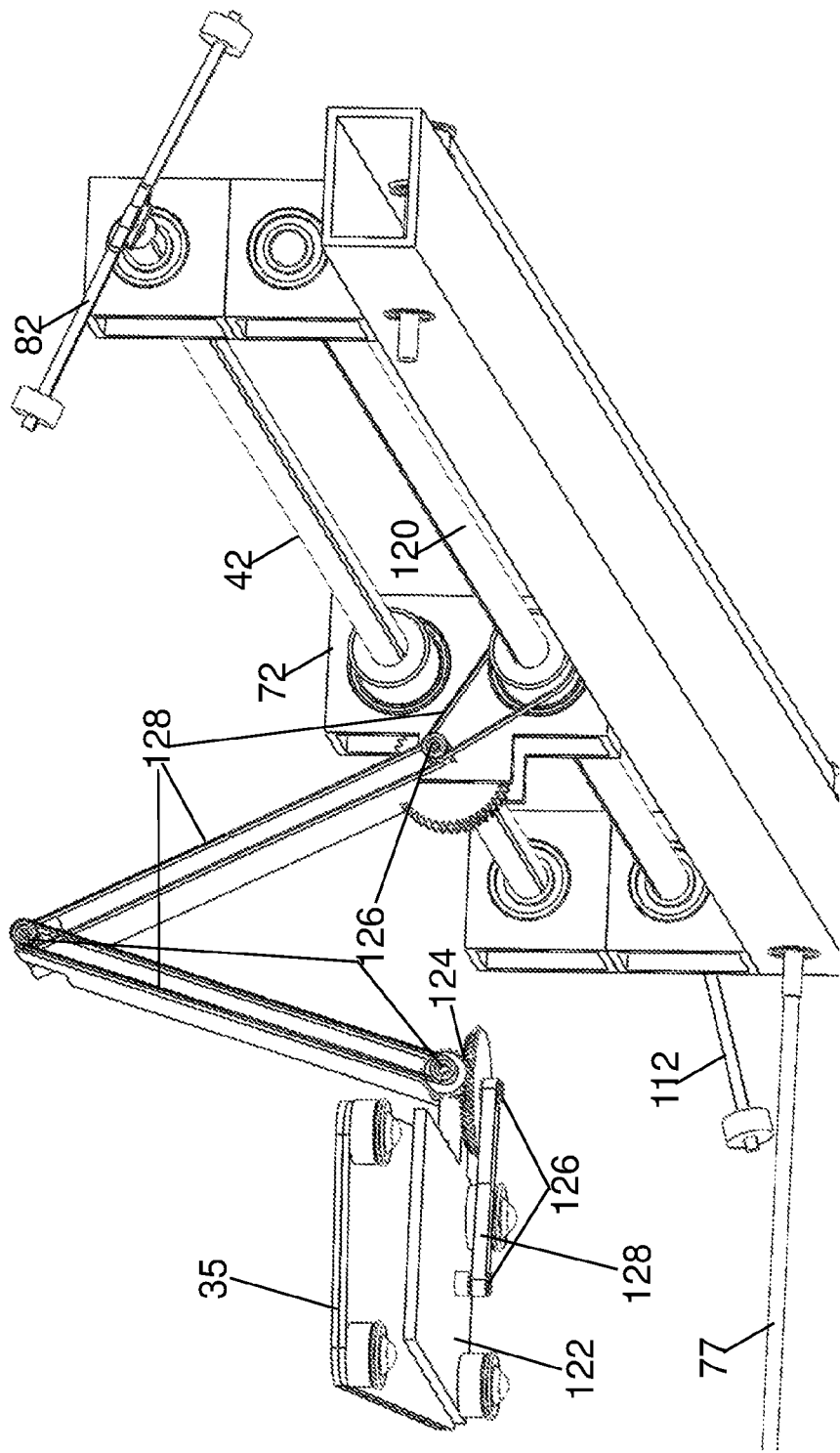

In embodiments shown in FIGS. 10-11, ambulation simulating apparatus 20 may include a dynamic inertia mechanism 112 which is reactive to the user's yaw foot displacement, according to some embodiments of the invention. Yaw reactive inertia mechanism 112 may be identical to, for example, transversally reactive inertia mechanism 82 and/or longitudinally reactive inertia mechanism 92. In some embodiments, yaw reactive inertia monarchism 112 may be kinematically connected to a longitudinally extending shaft 120.

In embodiments shown in FIG. 10-11, pinion enclosure 72 may be configured to be displaced along both longitudinal shaft 42 kinematically connected to transversally reactive inertia mechanism 82 and longitudinal shaft 120 kinematically connected to yaw reactive inertia mechanism 112.

In some embodiments, each of the foot rests 34, 35 may be pivotally connected to a stationary plate 122 to enable rotation of the respective foot rest in a plane that is parallel to the floor surface/rigid surface 24 of apparatus 20. In embodiments shown in FIGS. 10-11, each of foot rests 34, 35 may be connected to pinion enclosure 72 using an articulated arm 130 (e.g., instead of toothed rack element 67 described hereinabove). Articulated arm 130 may be coupled to pinion 69 using an arm gear 132 at the end of articulated arm 130. Articulated arm 130 may enable transversal motion of foot rests 34, 35.

The kinematic connection of each of the foot rests 34, 35 to longitudinal shaft 120 (e.g., that is kinematically connected to yaw reactive inertia mechanism 112) may be made through a set of gears 124, pulleys 126 and belts 128 (e.g., as shown in FIGS. 10-11). For example, at least some of gears 124, pulleys 126 and belts 128 may be disposed along articulated arm 130.

In some embodiments, articulated arm 130 may be configured to compensate for the nonlinear change in an angle of articulated arm 130 in response to transversal motion of foot rests 34, 35. For example, one or more gears 124 may be a spiral gear (e.g., gear having a variable diameter). In some embodiments, ambulation simulating apparatus 20 may include an additional articulated arm for compensating the nonlinear change in an angle of articulated arm 130 in response to transversal motion of foot rests 34, 35. The additional articulated arm may be, for example, perpendicular to articulated arm 130 and movably connectable at one end thereof to longitudinal shaft 120 and at another end thereof to pinion enclosure 72 or articulated arm 130.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An ambulation simulating apparatus, comprising:
   a user feet interface;
   a dynamic inertia mechanism; and
   a kinematic connection configured to enable transmission of motion between the dynamic inertia mechanism and the user feet interface;
   wherein the dynamic inertia mechanism is configured to:

in response to an active motion of a leg of a user on the user feet interface, rotate to store kinetic energy and provide an inertial load; and via the kinematic connection and the user interface, release the stored kinetic energy associated with the inertial load to counteract accelerating or decelerating leg of the user during each phase of an ambulatory cycle to provide the user with a sensation of stability.

2. The ambulation simulating apparatus of claim 1, comprising:
 a first and a second independently movable foot rests, wherein each of the first and second foot rests is coupled to the dynamic inertia mechanism by a corresponding kinematic connection to provide an inertial load; and
 a first and a second releasable coupling members couplable and decouplable with respect to the corresponding kinematic connection of the first and second foot rests, respectively;
 wherein the first and second coupling members are set to a coupled position with respect to the corresponding kinematic connection when a downwardly directed foot applied force is transmitted thereto to enable transmission of motion to the dynamic inertia mechanism in response to leg motion, and are set to a decoupled position with respect to the corresponding kinematic connection when the downwardly directed foot applied force is released.

3. The ambulation simulating apparatus according to claim 2, wherein the dynamic inertia mechanism is configured to at least one store kinematic energy and release the stored kinematic energy via the corresponding kinematic connection to a resting or decelerated foot rest of the first and second foot rests.

4. The ambulation simulating apparatus according to claim 2, wherein the dynamic inertia mechanism is responsive to at least one of:
 transversal motion of each of the first and second foot rests;
 longitudinal foot rest motion of each of the first and second foot rests; and
 yaw foot rest motion of each of the first and second foot rests.

5. The ambulation simulating apparatus according to claim 2, wherein a measure of engagement of each of the first and second coupling members with corresponding kinematic connection of the first and second foot rests is defined by a pressure applied by corresponding foot of a user on corresponding foot rest of the first and second foot rests.

6. The ambulation simulating apparatus according to claim 5, wherein each of the first and second foot rests comprises a pressure sensor configured to measure a pressure applied by the corresponding foot on the corresponding foot rest of the first and second foot rests, and wherein ambulation simulating apparatus comprises a processor configured to:
 receive readings from the pressure sensor of each of the first and second foot rests;
 determine the measure of engagement of each of the first and second coupling members with the corresponding kinematic connection of the first and second foot rests based on the readings of the corresponding pressure sensor; and
 control the first and second coupling members to engage with the corresponding coupling member of the first and second coupling members according the corresponding determined measure of engagement.

7. The ambulation simulating apparatus according to claim 2, further comprising at least one position sensor and at least one pressure sensor which are provided with each of the first and second foot rests, and a processor configured to receive and process a position indicating signal from each of the position sensors and a force indicating signal from each of the pressure sensors to determine characteristics of associated real-time leg motion.

8. The ambulation simulating apparatus according to claim 7, further comprising an immersed reality generating apparatus which is configured to generate images representative of an immersed reality environment that correspond to a real-time position of first and second legs of the user engaged with the first and second foot rests, respectively.

9. The ambulation simulating apparatus according to claim 1, wherein the dynamic inertia mechanism is reconfigurable in order to define a mechanism-specific moment of inertia.

10. The ambulation simulating apparatus according to claim 1, wherein each of the first and second foot rests comprises a vertically displaceable plate with which a corresponding foot is engageable throughout an ambulatory cycle.

11. The ambulation simulating apparatus according to claim 1, comprising a feet tracking and foot rests moving mechanism and a processor, and wherein:
 the feet tracking and foot rests moving mechanism comprises:
  a first and a second motor assemblies configured to move the first and the second foot rests, respectively, in at least one of a longitudinal direction, a transverse direction in a foot rests plane and about a yaw axis of the respective foot rest;
  feet tracking sensors configured to track movement of the feet of the user and to generate feet motion data indicative of the feet movement thereof; and
 the processor is configured to:
  detect, based on the feet motion data, that at least one foot of the user is not in contact with the respective at least one foot rest of the first and second foot rests;
  couple at least one coupling member of the first and second coupling members corresponding to the at least one foot rest with corresponding at least one motor assembly of the first and second motor assemblies;
  control the at least one motor assembly to move the respective at least one foot rest based on the feet motion data;
  detect, based on the feet motion data, that the at least one foot rest is in contact with the respective at least one foot rest; and
  decouple the at least one motor assembly from the respective at least one foot rest.

12. The ambulation simulating apparatus according to claim 1, comprising a backrest configured to constrain at least one of longitudinal, transversal and rotational movement of the user, the backrest is adjustable according to a height of the user and is configured to move in at least one of longitudinal, vertical, transversal, yaw, pitch and roll directions relative to a floor surface.

13. The ambulation simulating apparatus of claim 1, wherein the dynamic inertia mechanism comprises:
 a rotatable shaft;
 two oppositely directed bars connected to the rotatable shaft; and
 two weights, each of the two weights being connected to one of the two bars.

14. The ambulation simulating apparatus of claim 13, wherein at least one of a mass of the two weights, a distance of the two weights from the rotatable shaft, a rotational speed of the rotatable shaft and a rotational speed of the two weights is defined to provide the inertial load.

15. The ambulation simulating apparatus of claim 1, wherein a moment of inertia of the dynamic inertia mechanism is set such that the inertial load associated with the stored kinetic energy is equal to a foot applied force resulting from an actual moving body of the user.

16. A foot powered immersed reality system, comprising:
an ambulation simulating apparatus, comprising:
a user feet interface;
a dynamic inertia mechanism; and
a kinematic connection configured to enable transmission of motion between the dynamic inertia mechanism and the user feet interface;
wherein the dynamic inertia mechanism is configured to:
in response to an active motion of a leg of a user on the user feet interface, rotate to store kinetic energy and provide an inertial load; and
via the kinematic connection and the user interface, release the stored kinetic energy associated with the inertial load to counteract accelerating or decelerating leg of the user during each phase of an ambulatory cycle to provide the user with a sensation of stability;
at least one position sensor and at least one pressure sensor which are provided for each of a first and a second foots of the user; and
a processor configured to:
receive and process a position indicating signal from each of the position sensors and a force indicating signal from each of the pressure sensors to determine characteristics of associated real-time leg motion; and
generate images representative of an immersed reality environment that correspond to a real-time position of the first and second foots of the user.

17. The foot powered immersed reality system according to claim 16, wherein the ambulation simulating apparatus comprises:
a first and a second independently movable foot rests, wherein each of the first and second foot rests is coupled to the dynamic inertia mechanism by a corresponding kinematic connection to provide an inertial load; and
a first and a second releasable coupling members couplable and decouplable with respect to the corresponding kinematic connection of the first and second foot rests, respectively;
wherein the first and second coupling members are set to a coupled position with respect to the corresponding kinematic connection when a downwardly directed foot applied force is transmitted thereto to enable transmission of motion to the dynamic inertia mechanism in response to leg motion, and are set to a decoupled position with respect to the corresponding kinematic connection when the downwardly directed foot applied force is released.

18. The foot powered immersed reality system according to claim 17, wherein the dynamic inertia mechanism is configured to at least one store kinematic energy and release the stored kinematic energy via the corresponding kinematic connection to a resting or decelerated foot rest of the first and second foot rests.

19. The foot powered immersed reality system according to claim 17, wherein the dynamic inertia mechanism is responsive to at least one of:
transversal motion of each of the first and second foot rests;
longitudinal foot rest motion of each of the first and second foot rests; and
yaw foot rest motion of each of the first and second foot rests.

20. The foot powered immersed reality system according to claim 17, wherein each of the first and second foot rests comprises a vertically displaceable plate with which a corresponding foot is engageable throughout an ambulatory cycle.

21. The foot powered immersed reality system according to claim 17, wherein the ambulation simulating apparatus comprising a feet tracking and foot rests moving mechanism, the feet tracking and foot rests moving mechanism comprises:
a first and a second motor assemblies configured to move the first and the second foot rests, respectively, in at least one of a longitudinal direction, a transverse direction in a foot rests plane and about a yaw axis of the respective foot rest;
feet tracking sensors configured to track movement of the feet of the user and to generate feet motion data indicative of the feet movement thereof; and
wherein the processor is configured to:
detect, based on the feet motion data, that at least one foot of the user is not in contact with the respective at least one foot rest of the first and second foot rests;
couple at least one coupling member of the first and second coupling members corresponding to the at least one foot rest with corresponding at least one motor assembly of the first and second motor assemblies;
control the at least one motor assembly to move the respective at least one foot rest based on the feet motion data;
detect, based on the feet motion data, that the at least one foot rest is in contact with the respective at least one foot rest; and
decouple the at least one motor assembly from the respective at least one foot rest.

22. The foot powered immersed reality system according to claim 17, wherein a measure of engagement of each of the first and second coupling members with corresponding kinematic connection of the first and second foot rests is defined by a pressure applied by corresponding foot of a user on corresponding foot rest of the first and second foot rests.

23. The foot powered immersed reality system according to claim 22, wherein each of the first and second foot rests comprises a pressure sensor configured to measure a pressure applied by the corresponding foot on the corresponding foot rest of the first and second foot rests, and wherein the processor configured to:
receive readings from the pressure sensor of each of the first and second foot rests;
determine the measure of engagement of each of the first and second coupling members with the corresponding kinematic connection of the first and second foot rests based on the readings of the corresponding pressure sensor; and
control the first and second coupling members to engage with the corresponding coupling member of the first and second coupling members according the corresponding determined measure of engagement.

24. The foot powered immersed reality system according to claim 16, wherein the dynamic inertia mechanism is reconfigurable in order to define a mechanism-specific moment of inertia.

25. The foot powered immersed reality system according to claim 16, wherein the ambulation simulating apparatus comprises a backrest configured to constrain at least one of longitudinal, transversal and rotational movement of the user, the backrest is adjustable according to a height of the user and is configured to move in at least one of longitudinal, vertical, transversal, yaw, pitch and roll directions relative to a floor surface.

* * * * *